United States Patent [19]

Charles et al.

[11] Patent Number: 5,000,909
[45] Date of Patent: Mar. 19, 1991

[54] FERRITE BODY CONTAINING METALLIZATION

[75] Inventors: Richard J. Charles, Schenectady; Achuta R. Gaddipati, Scotia, both of N.Y.

[73] Assignee: General Electric Company, Schenectady, N.Y.

[21] Appl. No.: 520,495

[22] Filed: May 7, 1990

Related U.S. Application Data

[62] Division of Ser. No. 197,371, May 23, 1988.

[51] Int. Cl.$^5$ .............................................. B22F 7/00
[52] U.S. Cl. ......................................... 419/8; 419/19; 419/21; 419/36; 419/37; 419/54; 428/469; 428/552; 428/633; 428/639; 428/640; 428/673
[58] Field of Search ..................... 419/719, 21, 36, 33, 419/54; 428/469, 552, 633, 639, 640, 673

[56] References Cited

U.S. PATENT DOCUMENTS

| | | | |
|---|---|---|---|
| 3,247,573 | 4/1966 | Noack | 29/155.5 |
| 3,333,333 | 8/1967 | Noack | 29/604 |
| 3,333,334 | 8/1967 | Kuliczkowski et al. | 29/604 |
| 3,909,327 | 9/1975 | Pechini | 156/89 |
| 3,988,498 | 10/1976 | Maher | 428/434 |
| 4,515,850 | 5/1985 | Ishino et al. | 428/225 |
| 4,544,644 | 10/1985 | Yamashita et al. | 501/134 |
| 4,582,814 | 4/1986 | Thomas | 501/136 |
| 4,731,297 | 3/1988 | Takaya | 428/553 |
| 4,743,511 | 5/1988 | Sowman et al. | 419/54 |
| 4,746,557 | 5/1988 | Sakamoto et al. | 428/138 |
| 4,880,599 | 11/1989 | Charles et al. | 419/8 |

*Primary Examiner*—Stephen J. Lechert, Jr.
*Attorney, Agent, or Firm*—Jane M. Binkowski; James C. Davis, Jr.; James Magee, Jr.

[57] ABSTRACT

A composite comprised of a sintered matrix of spinel ferrite and a non-exposed continuous phase of elemental silver or Ag-Pd alloy ranging to 25 atomic % Pd is produced by co-firing a laminated structure of ferrite powder-containing tapes containing non-exposed metallization-forming material. The composite can be formed into a composite product which contains a continuous silver or Ag-Pd alloy phase with two end portions wherein only the end portions are exposed.

16 Claims, No Drawings

FERRITE BODY CONTAINING METALLIZATION

This application is a division of application Ser. No. 07/197,371, filed 05/23/88.

Copending U.S. patent application for "Ferrite Composite Containing Silver Metallization", Ser. No. 172,834 filed on Mar. 25, 1988, in the names of R. J. Charles and A. R. Gaddipati, assigned to the assignee hereof and incorporated herein by reference discloses the production of a composite comprised of a sintered matrix of spinel ferrite and an electrically conductive phase of elemental silver by co-firing a laminated structure of ferrite powder-containing tapes containing a silver metallization-forming material having two end portions wherein only the end portions are exposed.

This invention relates to the production of a sintered composite comprised of a sintered ceramic ferrite matrix containing a continuous metal phase, i.e. metallization, of elemental silver, or of a Ag-Pd alloy which ranges in Pd content to 25 atomic %, wherein the metal phase is not exposed to the ambient. The composite is useful for producing a composite product containing an electrically conductive metallization of silver, or of the Ag-Pd alloy, with two end portions wherein only the end portions are exposed to the ambient.

The low melting point (961° C.) and high vapor pressures of silver at the temperatures required for the co-firing of silver metallized spinel ferrites limit the practical use of silver as a metallization to its alloys with other precious metals. In particular, due to requisite melting points, metal/ceramic adhesion requirements and cost, the most common alloys utilized are those with palladium wherein palladium contents generally exceed 30 atomic %. A very large penalty results from the use of even 70/30 Ag-Pd since the resistivity of this alloy at 20° C. is of the order of 20 times that of silver.

The present invention enables the formation of a continuous metallization of silver in a co-fired ferrite body.

In another embodiment, the present invention enables the formation of a continuous metallization of an alloy of silver and palladium in the co-fired ferrite body. The present Ag-Pd alloy ranges in Pd content to about 25 atomic % and it is molten or partially molten at the maximum firing temperature, i.e. sintering temperature. By partially molten it is meant herein that at least about 5% by volume of the Ag-Pd alloy is molten. Generally, the Pd content of the alloy ranges from a detectable amount, i.e. an amount detectable by microprobe analysis, to about 25 atomic %, frequently from about 1 atomic % to about 20 atomic %, or from about 2 atomic % to about 10 atomic %. An alloy comprised of about 75 atomic % Ag-25 atomic % Pd has a solidus (fully solid) temperature of about 1100° C. and a liquidus (fully molten) temperature of about 1190° C. As the Pd content of the alloy deceases, its solidus and liquidus temperatures decrease. The use of the present Ag-Pd alloy may make processing easier.

Briefly stated, the present process for producing a solid sintered composite comprised of a sintered ferrite matrix totally enveloping a continuous metallization of elemental silver, or of a Ag-Pd alloy ranging in Pd content to 25 atomic %, said ferrite matrix having a resistivity greater than 500 ohm-centimeters, comprises:

(a) providing a ferrite powder;

(b) admixing said ferrite powder with an organic binding material;

(c) forming the resulting mixture into tape;

(d) providing a silver or Ag-Pd alloy metallization-forming material;

(e) forming a layered structure of at least two of said tapes containing said metallization-forming material therewithin in a pattern, said metallization-forming material being present in an amount sufficient to produce said metallization;

(f) laminating the layered structure forming a laminated structure wherein none of said pattern is exposed;

(g) firing said laminated structure to thermally decompose its organic component at an elevated temperature below about 600° C. leaving no significant deleterious residue in the resulting fired structure, said firing being carried out in an atmosphere or vacuum which has no significant deleterious effect on said composite;

(h) sintering the resulting fired structure at a temperature ranging from about 1000° C. to about 1400° C. in an oxygen-containing atmosphere to produce a sintered product having the composition of said composite, at least about 5% by volume of said Ag-Pd alloy being molten at said sintering temperature, said fired structure having a sufficient open volume available to accommodate the silver or Ag-Pd alloy during sintering; and (i) cooling said sintered product to produce said composite, said sintering and cooling being carried out in an atmosphere which has no significant deleterious effect on said composite; said ferrite powder having a composition which forms said ferrite matrix in said process.

In carrying out the present process, a ferrite powder is provided which produces the present sintered ferrite matrix having an electrical resistivity greater than 500 ohm-centimeters, preferably greater than 100,000 ohm-centimeters, at a temperature ranging from about 20° C. to about 100° C. These powders are available commercially or can be prepared by standard ceramic processing, generally by calcining a particulate mixture of the constituent oxides which react by solid-state diffusion to form the desired ferrite which is then milled to produce the desired particle size distribution. By "resistivity" herein, it is meant the electrical resistance of the present sintered ferrite in the form of a bar one centimeter long and one square centimeter in cross-section.

The ferrite powder is a magnetic oxide. The term "magnetic" is used herein to indicate a material which is magnetized by a magnetic field. The ferrite powder is known in the art as a spinel ferrite and it is of cubic symmetry. The present ferrite powder has a composition represented by the formula $MO(Fe_2O_3)_{1\pm x}$ where x has a value ranging from 0 to about 0.2, preferably ranging from 0 to about 0.1, and where M is a divalent metal cation selected from the group consisting of Mg, Mn, Fe, Co, Ni, Zn, Cu, and a combination thereof. Representative of useful ferrites include nickel zinc ferrite and manganese zinc ferrite.

If desired, a minor amount of an inorganic oxide additive which promotes densification or has a particular effect on magnetic properties of spinel ferrites can be included in the starting powder. Such additives are well known in the art and include $CaO$, $SiO_2$, $B_2O_3$, $ZrO_2$ and $TiO_2$. As used herein, the term "ferrite powder" includes any additive which forms part of the matrix of the present composite. The particular amount of additive is determinable empirically and frequently, it ranges from about 0.01 mol % to about 0.05 mol % of the total amount of ferrite powder, i.e. the total amount of matrix-forming powder.

The matrix-forming powder is a sinterable powder. Its particle size can vary. Generally, it has a specific surface area ranging from about 0.2 to about 10 meters$^2$ per gram, and frequently, ranging from about 2 to about 4 meters$^2$ per gram, according to BET surface area measurement.

The organic binding material used in the present process bonds the particles together and enables formation of the required thin tape of desired solids content, i.e. content of matrix-forming powder. The organic binding material thermally decomposes at an elevated temperature ranging to below about 600° C., generally from about 100° C. to to about 300° C., to gaseous product of decomposition which vaporizes away leaving no residue, or no significant deleterious residue.

The organic binding material is a thermoplastic material with a composition which can vary widely and which is well known in the art or can be determined empirically. Besides an organic polymeric binder it can include an organic plasticizer therefor to impart flexibility. The amount of plasticizer can vary widely depending largely on the particular binder used and the flexibility desired, but typically, it ranges up to about 50% by weight of the total organic content. Preferably the organic binding material is soluble in a volatile solvent.

Representative of useful organic binders are polyvinyl acetates, polyamides, polyvinyl acrylates, polymethacrylates, polyvinyl alcohols, polyvinyl butyrals, and polystyrenes. The useful molecular weight of the binder is known in the art or can be determined empirically. Ordinarily, the organic binder has an average molecular weight at least sufficient to make it retain its shape at room temperature and generally such an average molecular weight ranges from about 20,000 to about 200,000, frequently from about 30,000 to about 100,000.

Representative of useful plasticizers are dioctyl phthalate, dibutyl phthalate, diisodecyl glutarate, polyethylene glycol and glycerol trioleate.

In carrying out the present process, the matrix-forming powder and organic binding material are admixed to form a uniform or at least a substantially uniform mixture or suspension which is formed into a tape of desired thickness and solids content. A number of conventional techniques can be used to form the mixture and resulting green tape. Generally, the components are milled in an organic liquid or solvent in which the organic material is soluble or at least partially soluble to produce a castable mixture or suspension. Examples of suitable solvents are methyl ethyl ketone, toluene and alcohol. The mixture or suspension is then cast into a tape of desired thickness in a conventional manner, usually by doctor blading which is a controlled spreading of the mixture or suspension on a carrier from which it can be easily released such as Teflon, Mylar or silicone coated Mylar or glass. The cast tape is dried to evaporate the solvent therefrom to produce the present tape which is then removed from the carrier.

The particular amount of organic binding material used in forming the mixture is determinable empirically and depends largely on the amount and distribution of solids desired in the resulting tape. Generally, the organic binding material ranges from about 25% by volume to about 50% by volume of the solids content of the tape.

The present tape or sheet can be as long and as wide as desired, and generally it is of uniform or substantially uniform thickness. Its thickness depends largely on its particular application. Generally, the tape has a thickness ranging from about 25 microns to about 1000 microns, frequently ranging from about 50 microns to about 900 microns, and more frequently ranging from about 100 microns to about 800 microns.

The metallization-forming material can be any material containing or comprised of elemental silver or the Ag-Pd alloy which forms the desired continuous metallization of elemental silver or the Ag-Pd alloy in the present composite. The metallization-forming material comprised of elemental silver or Ag-Pd alloy can be in a number of physical forms such as particulates, or a solid body such as a strip, wire, sheet or punched sheet.

The metallization-forming material containing elemental silver or the Ag-Pd alloy usually is deposited from a suspension, for example, a paste or ink, of particles of silver or the present Ag-Pd alloy suspended in organic binder. The suspension is deposited, usually by screen printing, on the face of a tape and, when dry, produces the desired predetermined pattern of metallization-forming material. Such suspensions are known and are available commercially, and preferably, they are free of glass frit. Generally, the metal particles range in size from about 0.1 micron to about 20 microns. Any organic component of the metallization-forming material thermally decomposes at a temperature below about 600° C. leaving no residue or no significant deleterious residue A layered structure of at least two of the tapes is formed which contains the metallization-forming material therewithin in a desired pattern. The layered structure can be formed by a number of conventional techniques. For example, a pattern of metallization-forming material can be deposited on the face of a first tape and a second tape can be deposited on top of the pattern to cover it. Preferably, the tapes are substantially coextensive with each other, usually forming a sandwich-type structure. The configuration of the layered structure should permit the formation of the present laminated structure wherein none of the pattern is exposed to the ambient.

In another embodiment, the metallization-forming material is deposited or printed in a preselected form on the face of a number of tapes. Feedthrough holes may be punched in the tapes as required for layer interconnection and provided with metallization-forming material to provide a conductive path. The tapes can then be stacked together, generally one on top of the other, to produce the present layered structure wherein the totally deposited metallization-forming material comprises a pattern therewithin.

In another embodiment, the present layered structure contains a plurality of separate individual, i.e. discrete, patterns of metallization-forming material therewithin.

The layered structure is then laminated under a pressure and temperature determinable empirically depending largely on the particular composition of the organic binding material to form a laminated structure. Lamination can be carried out in a conventional manner. Laminating temperature should be below the temperature at which there is decomposition, or significant decomposition, of organic binding material and generally, an elevated temperature below 150° C. is useful and there is no significant advantage in using higher temperatures. Typically, the lamination temperature ranges from about 35° C. to about 95° C. and the pressure ranges from about 500 psi to about 3000 psi. Generally, lamination time ranges from about $\frac{1}{2}$ to about 5 minutes. Also, generally, lamination is carried out in air.

In the laminated structure, none of the pattern is exposed to the ambient, i.e. none of the silver is exposed to the ambient.

The metallization-forming material should be present in the laminated structure, i.e. the unsintered structure, in an amount at least sufficient to produce a continuous metallization in the sintered composite. The amount of metallization-forming material can vary with the particular amount for a given pattern depending largely on the desired thickness of the metallization in the sintered composite or composite product. Such amounts are determinable empirically.

Generally, the laminated structure is plastic, pliable or moldable and it can be arranged or shaped by a number of conventional techniques into a desired simple, hollow and/or complex form which is retained after sintering. For example, the laminated structure can be wound around into a coil in a single plane, or into a spiral form in a plurality of planes.

The laminated structure is fired to produce the present composite. At a temperature of less than about 600° C., thermal decomposition of organic material is completed producing a fired porous structure. Thermal decomposition can be carried out in any atmosphere, generally at about or below atmospheric pressure, which has no significant deleterious effect on the sample such as, for example, air. If desired, thermal decomposition may be carried out in a partial vacuum to aid in removal of gases.

The fired structure should have an open volume available to accommodate the metal, i.e. silver or Ag-Pd alloy, during sintering of the ferrite matrix. Specifically, during sintering, the matrix-forming powder densifies, i.e. it shrinks in volume, and the silver is totally molten whereas the Ag-Pd alloy is partially or totally molten. Since the metal is located within the structure, it cannot evaporate to any significant extent. Since the metal cannot shrink, it must have an open volume to squeeze into during sintering. The open accommodating volume should be sufficient to prevent bloating of the sintered composite and is determinable empirically. Generally, the open volume which should be made available to the metal prior to sintering of the ferrite matrix ranges from about 30% to about 60% by volume of the total volume of silver or Ag-Pd alloy. Preferably, the open volume is about 50% in excess of the total volume of metal. Also, preferably, no significant amount of the accommodating open volume remains in the sintered composite.

Sufficient open volume can be made available to the metal before sintering occurs by a number of techniques. It can be produced in the layered or laminated structures or in the fired structure. The open accommodating volume is directly connected with the metal prior to sintering but it may be located only at a portion of the pattern, or along a boundary thereof, or it can be dispersed through the pattern. For example, when the metallization-forming material is totally solid, such as a wire with two end portions, the accommodating volume can be comprised of a depression in the supporting tape open to each end portion.

Preferably, the accommodating volume is produced in the fired structure by depositing the pattern on the tape from a suspension of particles of elemental silver or of the Ag-Pd alloy, such as by screen printing. Typically, the metal particles occupy only about 50% by volume of the dried screen printed material with the remainder being organic material. The organic material thermally decomposes before sintering occurs and such decomposition automatically produces an open volume in the fired structure of about 50% in excess of the total volume of metal which frequently is the required open volume.

The pattern of metallization-forming material in the unsintered laminated structure can vary and depends largely on the pattern of the metallization desired in the sintered composite. Generally, the pattern is distributed, frequently significantly uniformly, in the unsintered laminated structure. In one embodiment, the pattern in the unsintered laminated structure has two end portions, and in another embodiment, it is in the form of a circle. However, the pattern in the unsintered laminated structure should form a metallization in the sintered composite which permits it to be useful for producing the present composite product.

The fired structure is sintered at a temperature ranging from about 1000° C. to about 1400° C., frequently from about 1100° C. to about 1300° C., depending largely on its composition and the particular composite desired. A temperature below about 1000° C. generally is not operable to produce the present composite. A temperature higher than about 1400° C. provides no advantage and may not produce the present composite.

Sintering is carried out in an oxygen-containing atmosphere the composition of which depends largely on the composition of the matrix-forming powder as well as on the matrix composition desired. Also, upon completion of sintering, the sintered product may be cooled in the same atmosphere used for sintering, or in some other atmosphere such as, for example, an atmosphere which may be needed to maintain certain matrix compositions. The sintering and cooling atmospheres should have no significant deleterious effect on the present composite. Generally, the sintering and cooling atmospheres are at about atmospheric or ambient pressure, and generally the sintered product is cooled to about room temperature, i.e. from about 20° C. to 30° C. The sintering and cooling atmospheres for the production of spinel ferrite bodies are well known in the art.

As an example, when all of the cations of the matrix-forming powder are in their highest valence, and such valence state is to be retained in the sintered matrix, sintering is carried out in an oxidizing oxygen-containing atmosphere. In such instance, oxygen generally is present in an amount greater than about 50% by volume of the atmosphere and the remaining atmosphere frequently is a gas selected from the group consisting of nitrogen, a noble gas such as argon, and a combination thereof. Usually, the sintering atmosphere is comprised of air or oxygen. Also, in such instance, the sintered product generally is cooled in an oxidizing oxygen-containing atmosphere, usually the same atmosphere used for sintering, or some other atmosphere in which the sintered product is inert or substantially inert to produce the desired composite.

However, as another example, if the matrix-forming ferrite powder contains $Fe^{2+}$ cation, or if the $Fe^{3+}$ is to be reduced to produce a certain small amount of $Fe^{2+}$ cation to produce certain magnetic properties, sintering is carried out in a reducing oxygen-containing atmosphere wherein the oxygen content is controlled to produce and/or maintain the $Fe^{2+}$ cation in the desired amount. Also, in this instance, upon completion of sintering, at least during part of the cooling cycle, the oxygen content of the atmosphere is controlled, usually decreased, to maintain the desired amount of $Fe^{2+}$ cation. Generally, the reducing oxygen-containing atmosphere is comprised of oxygen and nitrogen or an inert gas such as argon wherein the effective amount of oxygen generally ranges up to about 10% by volume of the atmosphere.

Generally, sintering can be controlled in a conventional manner, i.e. by shortening sintering time and/or lowering sintering temperature, to produce a sintered matrix having a desired density or porosity or having a desired grain size. Sintering time may vary widely and generally ranges from about 5 minutes to about 5 hours. Usually, the longer the sintering time or the higher the sintering temperature, the more dense is the matrix and the larger is the grain size.

In one embodiment of the present invention, where silver or Ag-Pd wire having a diameter of less than about 5 mils is used to form the metallization, or part of the metallization, in the sintered composite, open volume generally need not be provided to accommodate the molten metal during sintering. In such instance, plastic deformation of the matrix during sintering may accommodate ferrite shrinkage without cracking the sample. In this embodiment, the wire can vary in length as desired but generally its length is greater than about 10 mils.

The present sintered matrix has a porosity ranging from about 0%, or about theoretical density, to about 40% by volume of the sintered matrix. The particular porosity depends largely on the particular magnetic properties desired. For several applications, the porosity of the sintered matrix ranges from about 5% to about 30%, or from about 10% to about 25%, and frequently it is about 15%, by volume of the total volume of the matrix. Generally, the lower the porosity of the matrix, the higher is its magnetic permeability. In the present composite, porosity is distributed therein, preferably significantly or substantially uniformly. Generally, the pores in the sintered matrix range in size from about 1 micron to about 100 microns, frequently from about 10 microns to about 70 microns. The pores may be closed and/or interconnecting.

Generally, the average grain size of the present sintered matrix ranges from about 5 microns to about 100 microns, frequently from about 10 microns to about 80 microns, or from about 20 microns to about 60 microns, or from about 30 microns to about 50 microns. Generally, with increasing grain size, the magnetic permeability of the composite increases. On the other hand, generally with decreasing grain size, the lower are the electrical losses.

The present sintered composite is comprised of a polycrystalline matrix of ferrite totally enveloping a continuous metallization of elemental silver or of a Ag-Pd alloy ranging to 25 atomic % Pd. The sintered ferrite matrix is in direct contact with the metallization. In one embodiment, the present composite contains a plurality of continuous metallizations of silver alone, or of the Ag-Pd alloy, which are electrically isolated from each other Frequently, each metallization has two end portions. The presence of the metallization in the composite can be determined by x-ray.

The present invention enables the direct production of a sintered composite of desired shape and size. The sintered composite is free of bloating.

The present sintered composite is useful for producing a composite product which is comprised of the ferrite matrix enveloping a continuous, i.e. electrically conductive, metallization of silver or the present Ag-Pd alloy with two end portions, wherein only both end portions are exposed to the ambient and are at least sufficient for electrical contact to be made such as, for example, by soldering a lead thereon.

A number of conventional techniques can be used to produce the composite product. In one embodiment, where the sintered composite contains a metallization with two end portions, a portion of the matrix can be removed, for example by polishing it off, to expose the end portions. In another embodiment, the sintered composite is sliced or cut, for example by means of a diamond saw, to produce one or more of the present composite products. In yet another embodiment, where the sintered composite contains a plurality of electrically isolated continuous metallizations, it can be sliced to produce one or more composite products with a plurality of electrically isolated continuous metallizations wherein each metallization has two end portions which are exposed to the ambient.

The continuity of the metallization in the composite product can be determined by a number of conventional techniques such as, for example, by contacting its exposed end portions with leads to determine electrical conductivity.

The thickness of the electrically conductive metallization in the sintered composite or composite product can vary depending largely on its application. Generally, it ranges from about 2 to about 800 microns, frequently from about 20 to about 150 microns.

The present sintered ferrite matrix is a soft magnetic material of cubic symmetry. Its composition is the same as that given herein for the matrix-forming material. It can be magnetized but loses its magnetization when the source of magnetization is removed. For example, when a voltage is applied across both exposed end portions of the metallization in the present composite product, current is passed therethrough producing a magnetic field which magnetizes the ferrite matrix thereby storing electrical energy therein. When the voltage is removed, the ferrite matrix will demagnetize giving back the electrical energy as a reverse electrical current in the metallization.

The present composite product has a number of uses. It is useful as an electrical component in an electrical circuit. It is particularly useful as an electrical inductor such as, for example, a tuning coil or a filter coil.

When the present composite product contains two or more separate metallizations, i.e. conductors or windings, each of which is accessed by two exposed end portions, such a composite product is useful as an electrical transformer.

The invention is further illustrated by the following examples wherein the procedure was as follows unless otherwise stated:

An air furnace with molybdenum disilicide heaters was used.

The firing, sintering and cooling was carried out in air at about atmospheric pressure.

The ferrite powder was a sinterable powder.

The organic binding material used to form the tape was comprised of commercially available organic binder comprised of polyvinylbutyral (average molecular weight of about 32,000) and commercially available liquid plasticizer comprised of polyunsaturated hydroxylated low-molecular weight organic polymers. Specifically, the organic binding material was comprised of 4.13 grams of polyvinylbutyral and 1.48 grams of liquid plasticizer per 100 grams of ferrite powder.

The screen printing ink was a commercially available ink comprised of a suspension of silver particles in a solution of organic binder. About 50% by volume of the dried screen printed material was comprised of silver particles with the remainder being organic material.

In the laminated structure, none of the silver was exposed to the ambient.

Standard techniques were used to characterize the composite for density, microstructure and electrical properties.

EXAMPLE 1

A calcined ferrite powder having a composition comprised of 14.12 mol% NiO, 24.45 mol% ZnO, 1.15 mol% MnO and 60.28 mol% $Fe_2O_3$ % was used. It had a specific surface area of about 1 $m^2/g$.

Ferrite tapes were prepared by the tape casting technique. 5.61 grams of the organic binding material were dissolved at ambient temperature in 50 grams of a mixture of 33 grams of toluene and 17 grams of methyl alcohol. The resulting solution was admixed with 100 grams of ferrite powder in a ball mill for about 4 hours at room temperature. The resulting slurry was tape cast on a Mylar sheet using a doctor blade, then dried in air at room temperature and atmospheric pressure to remove the solvent, and the resulting tape was stripped from the Mylar sheet.

Each tape was about 6 inches wide, 30 inches long and had a substantially uniform thickness of about 20 mils. Ferrite powder was distributed in each tape substantially uniformly and comprised about 52% by volume of the tape.

Each tape was cut to lengths of about 1.5 inches and width of about 1.5 inch to form blanks.

With a screen mask, a pattern was screen printed on a face of a single layer blank to form a pattern which was a partially closed circle with two extending, parallel legs (a Greek letter Omega shape). The outside diameter of the partial circle was 0.900 in., the trace width was uniformly 0.100 in., the legs extended from the circle perimeter by about 0.25 in. The screen printing was dried in air at room temperature and when dried was about 1 mil thick.

An unprinted blank was placed on top of the printed blank covering the pattern and forming essentially a sandwich structure. This structure was laminated in air in a laminating press at about 93° C. under a pressure of about b 800 psi for about ½ minute. No portion of the pattern extended to any surface of the resulting laminated structure.

The laminated structure was placed in an open alumina boat and fired in air. As the temperature was raised, the organic component thermally decomposed and vaporized away below 600° C. The sample was sintered at a temperature of about 1280° C. for 30 minutes and then furnace-cooled to room temperature.

The resulting composite was comprised of a polycrystalline ferrite matrix which totally enveloped a phase of elemental silver.

From other work it was known that the ferrite matrix had a composition which was the same as, or did not differ significantly from, that of the starting ferrite powder, and that it was of cubic symmetry.

A rotating diamond saw was used to cut off a portion of the ferrite matrix which was then polished in a standard manner to expose the two leg portions of the silver phase thereby producing the present composite product. Electrical resistance measurements between the leg sections was less than 0.1 ohm. Since the resistivity of the ferrite matrix was greater than 1 megohm-cm, the electrical measurements of the silver phase, i.e. trace, showed that the silver conduction path was continuous. A structure of this type would be useful as an electrical inductor.

For examination purposes, a portion of the matrix was cut and polished away across the circle portion of the omega-shaped silver phase. Examination of the resultant product, as well as an x-ray of the sintered composite before it was cut, showed that the silver metallization was fully retained within the sintered matrix and uniformly shrank in trace width and shape to accommodate about a 19% linear shrinkage of both the silver ink deposit and the ferrite. The sintered ferrite matrix showed a grain size of about 10 microns and a porosity of about 10 volume %. The final silver trace was almost its initial thickness (about 1 mil).

EXAMPLE 2

Two printed blanks and an unprinted blank were produced as disclosed in Example 1. The blanks were assembled into a three layer structure with the blanks substantially coextensive with each other and the two printed patterns separated and within the structure. The layered structure was laminated as disclosed in Example 1.

In the laminated structure, none of the patterns were exposed to the ambient.

The laminated structure was fired in the same manner as disclosed in Example 1 and furnace-cooled to room temperature.

The resulting composite was comprised of a polycrystalline ferrite matrix which totally enveloped each of two electrically isolated continuous phases of elemental silver. The sintered composite showed by x-ray two separate, continuous silver phases.

The sintered composite showed a linear shrinkage of about 19%.

Standard structural analysis of the sintered composite showed that the silver phase, i.e. windings, were continuous and electrically isolated from one another, each with a thickness of about 1 mil. The ferrite matrix showed the same structural characteristics as the matrix produced in Example 1.

A structure of this kind, i.e. the sintered composite product which could be produced by removing portions of the matrix to expose the two end portions of each silver phase, would be useful as an electrical transformer.

EXAMPLE 3

Several unprinted ferrite tapes, i.e. blanks, were produced as disclosed in Example 1.

A sandwich structure of three blank layers, i.e. the layers were coextensive with each other, was laminated as disclosed in Example 1. Several of such three layer laminated structures were produced.

Solid strips of elemental silver about ⅜ inch long and 0.125 inch by 0.003 inch cross-section were used.

A silver strip was placed on top of the three layer laminated structure, i.e. on a face thereof, and two additional ferrite blank layers were placed on top of the silver to form a five layer sandwich structure which was laminated as disclosed in Example 1. None of the silver in the laminated structure was exposed to the ambient. Three such five layer laminated structures were produced and are shown as Runs 1-3 in Table I.

A slot was machined into a face of the remaining three layer laminated structures. A silver strip was placed in each slot. Each slot was 0.003 inch deep by ⅝ inch long. The slots varied in width to accommodate excess volumes in the slots unoccupied by the silver strips in amounts equal to 15, 20, 25, 30, 50 and 60% of the initial volume of the individual solid silver strip. Two additional blank layers were placed on top of each silver strip to form a five layer sandwich structure which was laminated as disclosed in Example 1. None of the silver in the laminated structures was exposed to the ambient.

Each of the laminated structures was fired in the same manner as disclosed in Example 1 and furnace-cooled to room temperature. The results are shown in Table I.

TABLE I

| Run | Sample No. | Excess Slot Vol. % | Shrinkage % linear | Silver Conductor thickness | Silver Conductor form | Sintered composite integrity |
|---|---|---|---|---|---|---|
| 1 | Q1MT -8A | 0 | 19 | 3 mil | discont. | catastrophically cracked |
| 2 | -8B | 0 | 19 | " | " | ically |
| 3 | -8C | 0 | 19 | " | " | cracked |
| 4 | Q1MT -9A | 15 | 18 | " | continuous | small |
| 5 | -9B | 20 | " | " | " | internal |
| 6 | -9C | 25 | " | " | " | cracks |
| 7 | -9D | 30 | " | " | " | sound |
| 8 | Q1MT -13A | 50 | 19 | " | continuous | sound |
| 9 | -13B | 60 | " | " | " | " |

Runs 7-9 illustrate the present invention. In the sintered composites of Runs 7-9, none of the silver phase was exposed to the ambient and the ferrite matrices showed a grain size, shrinkage and porosity which were substantially the same as that disclosed for the ferrite matrix in Example 1. The sintered composites of Runs 7-9 were free of bloating.

The results in Table I show that by incorporating an appropriate excess internal volume around the metallization which is sufficient to account for the volume shrinkage of the ferrite during co-firing, integral structures of ferrite with continuous pure silver conductors may be obtained without providing access of the metallizations to a free surface for liquid metal pressure equalization and without developing internal pressures which crack the body. Table I shows that such excess volume ranges from about 30% to about 60% of the elemental silver within the unsintered structure.

If portions of the ferrite matrix were removed from the sintered composites produced in Runs 7-9 to expose only both end portions of each silver phase, the resulting composite products would be useful as electrical inductors.

EXAMPLE 4

Several unprinted ferrite tapes, i.e. blanks, were produced as disclosed in Example 1.

A sandwich structure of three blank layers, i.e. the layers were coextensive with each other, was laminated as disclosed in Example 1.

Solid wires of elemental silver half-inch long and 25 mil in diameter were used.

A pocket was machined into a face of the laminated structure. A silver wire was placed across the pocket. Two additional blank layers were placed on top of the silver wire to form a five layer sandwich structure which was laminated as disclosed in Example 1. None of the silver in the laminated structure was exposed to the ambient. The pocket was geometrically centered within the resulting laminated structure and was machined to accept the wire with a pocket volume of about 50% in excess of the wire volume.

A second five layer laminated structure was prepared in the same manner except that the pocket was machined to accept the wire with a pocket volume of about 60% in excess of the wire volume.

The five layer laminated structures were fired at about 1280° C. for 30 minutes in an open boat in air and then cooled to room temperature.

In the resulting sintered composites, none of the silver was exposed to the ambient.

The resulting sintered composites were free of cracks and warpage and showed by x-ray that the wires remained continuous and also assumed the general shape of the original machined pockets reduced by a linear shrinkage of about 20%. The wire embedded in the pocket of 50% excess volume showed a smoother conformation to the original pocket shape indicating that the preferred excess volume for the silver to accommodate ferrite shrinkage is about 50%.

If portions of the ferrite matrix were removed from the sintered composites to expose only both end portions of each silver phase, the resulting composite products would be useful as electrical inductors.

What is claimed is:

1. A process for producing a solid sintered composite comprised of a sintered ferrite matrix totally enveloping a continuous metallization of elemental silver or of Ag-Pd alloy ranging to 25 atomic % Pd, said ferrite matrix having an electrical resistivity greater than 500 ohm-centimeters at a temperature ranging from about 20° C. to about 100° C., which comprises:

(a) providing a ferrite powder;
(b) admixing said ferrite powder with an organic binding material;
(c) forming the resulting mixture into tape;
(d) providing a silver or Ag-Pd alloy metallization-forming material;
(e) forming a layered structure of at least two of said tapes containing said metallization-forming material therewithin in a pattern, said metallization-forming material being present in an amount sufficient to produce said metallization;
(f) laminating the layered structure forming a laminated structure wherein none of said pattern is exposed;
(g) firing said laminated structure to thermally decompose its organic component at an elevated temperature below about 600° C. leaving no significant deleterious residue in the resulting fired structure, said firing being carried out in an atmosphere or vacuum which has no significant deleterious effect on said composite;

(h) sintering the resulting structure at a temperature ranging from about 1000° C. to about 1400° C. in an oxygen-containing atmosphere to produce a sintered product having the composition of said composite, at least about 5% by volume of said Ag-Pd alloy being molten at said sintering temperature, said fired structure having a sufficient open volume available to accommodate the silver or Ag-Pd alloy during sintering; and (i) cooling said sintered product to produce said composite, said sintering and cooling being carried out in an atmosphere which has no significant deleterious effect on said composite, said ferrite powder having a composition which forms said ferrite matrix in said process.

2. The process according to claim 1 which is carried out in air.

3. The process according to claim 1 wherein said metallization-forming material is comprised of particulates of a metal selected from the group consisting of elemental silver and an alloy of silver and palladium containing palladium in an amount ranging to 25 atomic %.

4. The process according to claim 1 wherein said metallization-forming material is comprised of a solid body of metal selected from the group consisting of elemental silver and an alloy of silver and palladium containing palladium in an amount ranging to 25 atomic %.

5. The process according to claim 1 wherein said sintered ferrite matrix has a porosity ranging from about 0% to about 40% by volume of said matrix.

6. The process according to claim 1 wherein said sintered composite is formed into a composite product comprised of said ferrite phase enveloping a continuous metallization which has two end portions wherein only the end portions are exposed at least sufficiently for electrical contact to be made therewith.

7. The process according to claim 1 wherein said ferrite matrix has a composition comprised of $MO(Fe_2O_3)_{1\pm x}$ where x has a value ranging from 0 to about 0.2 and where M is a divalent metal cation selected from the group consisting of Mg, Mn, Fe, Co, Ni, Zn, Cu and a combination thereof.

8. The process according to claim 1 wherein x has a value ranging from 0 to about 0.1.

9. The process according to claim 1 wherein before said firing, said laminated structure is shaped into a simple, hollow and/or complex form.

10. The process according to claim 1 wherein before said firing, said laminated structure is wound into a coil in substantially a single plane.

11. The process according to claim 1 wherein said laminated structure is wound into a spiral in a plurality of planes.

12. The process according to claim 1 wherein said laminated structure contains a plurality of said patterns, each of said patterns being separate from the other.

13. The process according to claim 1 wherein said sintering temperature ranges from about 1100° C. to about 1300° C.

14. A process for producing a solid sintered composite comprised of a sintered ferrite matrix containing therewithin a continuous metallization of elemental silver or Ag-Pd alloy ranging to 25 atomic % Pd, said ferrite matrix having an electrical resistivity greater than 500 ohm-centimeters at a temperature ranging from about 20° C. to about 100° C., which comprises:

(a) providing a ferrite powder;
(b) admixing said ferrite powder with an organic binding material;
(c) forming the resulting mixture into tape;
(d) providing a wire of silver or Ag-Pd alloy ranging to 25 atomic % Pd having a diameter of less than 5 mils;
(e) forming a layered structure of at least two of said tapes containing said wire therewithin;
(f) laminating the layered structure forming a laminated structure wherein none of said wire is exposed;
(g) firing said laminated structure to thermally decompose its organic component at an elevated temperature below about 600° C. leaving no significant deleterious residue in the resulting fired structure, said firing being carried out in an atmosphere or vacuum which has no significant deleterious effect on said composite;
(h) sintering the resulting structure at a temperature ranging from about 1000° C. to about 1400° C. in an oxygen-containing atmosphere to produce a sintered product having the composition of said composite, at least about 5% by volume of said Ag-Pd alloy being molten at said sintering temperature; and
(i) cooling said sintered product to produce said composite, said sintering and cooling being carried out in an atmosphere which has no significant deleterious effect on said composite, said ferrite powder having a composition which forms said ferrite matrix in said process.

15. The process according to claim 14 which is carried out in air.

16. The process according to claim 14 wherein said sintered composite is formed into a composite product comprised of said ferrite phase enveloping a continuous metallization which has two end portions wherein only the end portions are exposed at least sufficiently for electrical contact to be made therewith.

* * * * *